United States Patent [19]

Fuhrer et al.

[11] 4,124,867

[45] Nov. 7, 1978

[54] NARROWED-ELECTRODE PICKUP STYLUS FOR VIDEO DISC SYSTEMS

[75] Inventors: Jack S. Fuhrer, Princeton Junction; Eugene O. Keizer, Princeton, both of N.J.

[73] Assignee: RCA Corporation, New York, N.Y.

[21] Appl. No.: 782,020

[22] Filed: Mar. 28, 1977

[51] Int. Cl.² .............................................. G11B 3/44
[52] U.S. Cl. ..................................... 358/128; 274/38
[58] Field of Search ............... 179/100.41 G, 100.1 B; 274/38; 358/128

[56] References Cited

U.S. PATENT DOCUMENTS

| | | | |
|---|---|---|---|
| 1,817,094 | 8/1931 | Moore | 274/38 |
| 2,017,696 | 10/1935 | Hesse | 274/38 |
| 3,184,242 | 5/1965 | Marcucci et al. | 274/38 |
| 3,292,936 | 12/1966 | Grado | 274/38 |
| 3,654,401 | 4/1972 | Dickopp et al. | 179/100.4 M X |
| 3,842,194 | 10/1974 | Clemens | 179/100.4 M X |
| 4,013,830 | 3/1977 | Pinch et al. | 274/38 X |
| 4,031,546 | 6/1977 | Leedom | 179/100.4 R X |

FOREIGN PATENT DOCUMENTS 615,836  10/1926  France ..................... 274/38

*Primary Examiner*—John H. Wolff
*Attorney, Agent, or Firm*—Eugene M. Whitacre; Joseph S. Tripoli; Dilip A. Kulkarni

[57] ABSTRACT

A novel pickup stylus adapted for playing back prerecorded signals from a video disc has an arrowhead-shape cross-section in the region of its tip. The pickup stylus includes a dielectric support element which has a prow defining the apex of the arrowhead-shape cross-section and a substantially flat rear surface remote from the prow defining the base of the arrowhead-shape cross-section. The entire rear surface is covered with conductive material to form a narrowed-electrode in the region of its tip.

6 Claims, 17 Drawing Figures

U.S. Patent  Nov. 7, 1978  Sheet 1 of 3  4,124,867
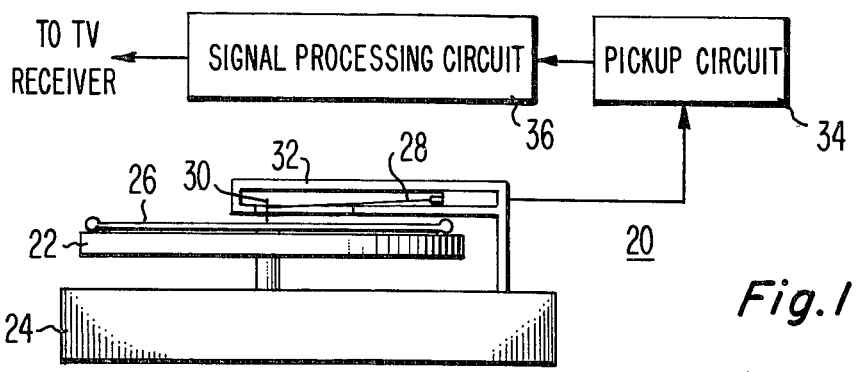
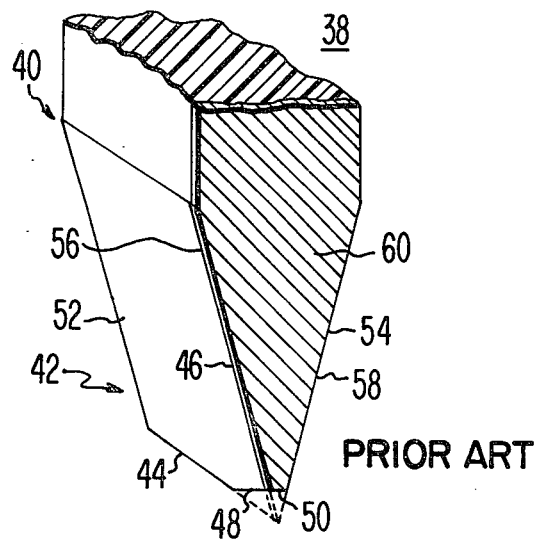
Fig.2  PRIOR ART
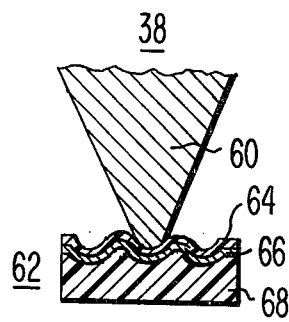
Fig.3
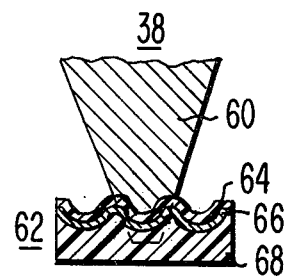
Fig.4
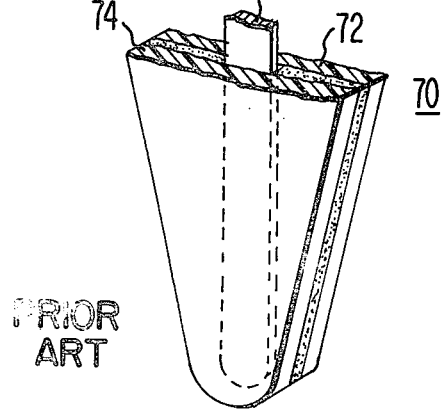
Fig.5  PRIOR ART
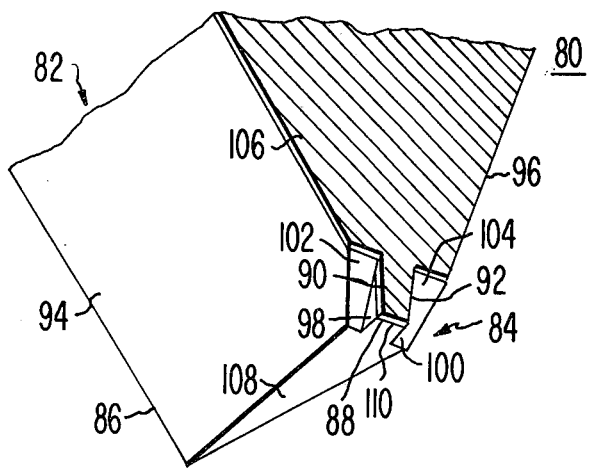
Fig.6

NARROWED-ELECTRODE PICKUP STYLUS FOR VIDEO DISC SYSTEMS

The present invention relates to a novel disc record playback system of a form suitable for playback of high density information records, such as video discs, and to a novel stylus structure advantageous for use in such playback systems.

BACKGROUND OF THE INVENTION

In U.S. Pat. No. 3,842,194 issued on Oct. 15, 1974 to Jon K. Clemens, a video playback system of a variable capacitance form is disclosed. In one configuration of the Clemens system, information, representative of recorded picture and sound, is encoded in a relatively fine spiral groove on the surface of a disc record (e.g., groove width 3.5 micrometers, groove depth 1.0 micrometers). The record substrate is covered with a coating of conductive material and a dielectric layer overlying the conductive coating. During playback, a pickup stylus, having a thin conductive electrode (e.g., about 0.2 micrometers thick), engages the groove as the record is rotated by a supportive turntable. Capacitive variations between the stylus electrode and the conductive coating are sensed to recover the prerecorded information.

In the systems of the above type, the use of a relatively fine record groove and the groove-engaging requirement for the pickup stylus result in a stylus tip which is extremely small.

Typically, the stylus tip is defined by a prow, a substantially flat, V-shaped rear surface remote from the prow, a bottom surface extending from the bottom edge of the rear surface and a pair of side surfaces extending from the side edges of the rear surface and converging at the prow. The intersection of the rear and the side surfaces with the bottom surface forms, for example, a triangular footprint. The entire rear surface is covered with conductive material to form a V-shaped electrode. Illustratively, the angle included between the two side edges is equal to 42°, the length of the bottom edge is about 2 micrometers, the height of the triangular footprint is about 4 micrometers, the angle between the prow and the rear surface is about 40° and the electrode depth is about 0.2 micrometers.

In the previously mentioned Clemens patent, two alternative forms of stylus structure are disclosed: (1) a symmetrical structure, wherein the conductive stylus electrode is "sandwiched" between dielectric support material, which extends ahead of, and behind, the electrode in symmetrical fashion (FIG. 1); and (2) an "asymmetrical" structure, wherein the stylus electrode comprises a conductive coating on the rear surface of a dielectric support (FIG. 5).

The asymmetrical stylus form has proven to be convenient for ease in stylus fabrication, in that the entire rear surface is coated with conductive material. However, the stylus electrode, being V-shaped, gets wider as the stylus structure wears away. As the stylus electrode gets wider, the spurious capacitance between the electrode and the conductive coating in the adjacent grooves becomes significant, introducing noise in the recovered signal. When the stylus electrode becomes wider than the groove width (e.g., 3.5 micrometers), it is desirable to replace the stylus.

Although the sandwich form of the stylus structure overcomes the problem of increasing cross-talk with the increase in the width of the stylus electrode, it is difficult to fabricate. In particular, it is difficult to achieve a good registration (i.e., position, attitude, etc.) between the stylus electrode and the stylus tip.

SUMMARY OF THE INVENTION

A novel pickup stylus structure for playing back prerecorded signals from a disc record groove of a given width, pursuant to the present invention, overcomes these problems and yet is relatively easy to fabricate. The pickup stylus comprises a dielectric support element which converges toward a tip. The dielectric support element has an arrowhead-shape cross-section in the region of its tip. The arrowhead-shape cross-section is defined by a prow, a substantially flat rear surface remote from the prow having substantially parallel edges, a pair of side surfaces converging toward the prow, a pair of additional side surfaces extending from the substantially parallel edges of the rear surface and proceeding toward the prow, and shoulder surfaces interconnecting the converging surfaces and the additional surfaces.

The maximum distance between the substantially parallel edges of the rear surface, in the region of the stylus tip, is less than the given groove width.

The entire rear surface is covered with conductive material between its substantially parallel edges to form a narrowed-electrode in the region of its tip.

BRIEF DESCRIPTION OF THE DRAWINGS

In the drawings:

FIG. 1 illustrates a video disc system for playing back prerecorded signals recorded in a disc record groove of a given width in which a narrowed-electrode stylus constructed in accordance with the present invention may be advantageously employed;

FIG. 2 illustrates an asymmetrical form of a prior art pickup stylus structure;

FIGS. 3 and 4 depict successive steps in the life of the asymmetrical stylus of FIG. 2, the asymmetrical stylus being shown riding in a disc record groove;

FIG. 5 shows a sandwich form of a pickup stylus structure;

FIG. 6 illustrates a perspective view of a narrowed-electrode pickup stylus structure, in accordance with the principles of the present invention, suitable for use in the system of FIG. 1;

DETAILED DESCRIPTION OF THE PREFERRED EMBODIMENT

Figure 7:
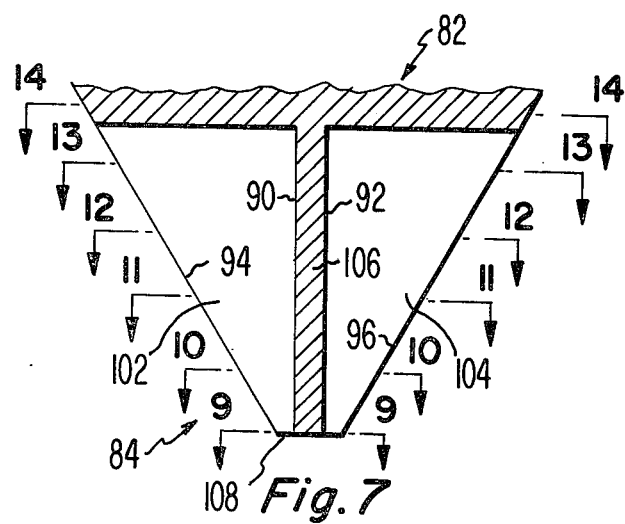
FIGS. 7 and 8 are respectively the front view and the side view of the narrowed-electrode pickup stylus of FIG. 6.

Referring to FIG. 1, there is illustrated therein a video disc system 20 which is illustratively of a variable capacitance type as generally shown in the aforesaid Clemens patent. The system 20 includes a turntable 22 rotatably mounted on a base 24 for rotation at a proper playback speed (e.g., 450 rpm). The turntable 22 supports and centers a video disc 26 having information, representative of picture and sound, recorded along a spiral groove disposed on the surface thereof. To obtain an adequate playback time, the groove convolutions on the video disc 26 are relatively closely spaced (e.g., groove pitch — 3.5 micrometers). As stated previously, the video disc 26 has a dielectric deposit overlying a conductive coating on the video disc substrate.

A stylus arm 28, carrying a groove-engaging pickup stylus 30 at the free end thereof, is pivotally supported at its remote end to a carriage 32. The stylus arm pivot is, for example, of the type disclosed in U.S. Pat. No. 3,917,903 issued to B. K. Taylor, et al.

To enable the pickup stylus 30 to maintain a desired constant attitude in the video disc groove, the carriage 32 is traversed radially of the video disc 26 during playback at a speed suitably synchronized with the rotation of the video disc. The carriage traversing system is, for example, of the type shown in U.S. Pat. No. 3,870,835 issued to F. R. Stave.

As previously indicated, the pickup stylus 30 incorporates a relatively thin electrode (e.g., 0.2 micrometers deep). The capacitance variations between the stylus electrode and the video disc conductive coating are sensed during playback by a pickup circuit 34. The output of the pickup circuit 34 is processed by a signal processing circuit 36 to a form suitable to be used by a television receiver. The pickup circuit 34 is, for example, of the type illustrated in the copending U.S. Pat. application Ser. No. 743,144, of H. Kawamoto, et al assigned to the same assignee as this application, and now U.S. Pat. No. 4,080,625. The signal processing circuit 36 is, for example, of the type illustrated in U.S. Pat. No. 3,969,757 issued to J. Amery.

FIG. 2 shows an asymmetrical prior art pickup stylus having a V-shaped tip. The asymmetrical stylus 38 includes a dielectric support element 40 which has a V-shaped tip 42. The terminal portion of the V-shaped tip 42 is defined by a prow 44, a substantially flat rear surface 46 remote from the prow, a bottom surface 48 extending from the bottom edge 50 of the rear surface and a pair of side surfaces 52 and 54 extending, respectively, from the side edges 56 and 58 of the rear surface and intersecting at the prow. The intersection of the rear surface 46 and the side surfaces 52 and 54 with the bottom surface 48 defines for example, a triangular stylus footprint. The entire rear surface 46 of the stylus support element 40 is coated with conductive material to form an electrode 60.

FIGS. 3 and 4 show successive stages in the life of the asymmetrical stylus 38 riding in a groove disposed on the surface of a video disc 62 having a dielectric deposit 64 overlying a conductive coating 66 on the video disc substrate 68.

As the asymmetrical stylus 38 wears to a shape shown in FIG. 4, the width of the stylus electrode 60 becomes the same as the distance betwen the adjacent grooves (e.g., 3.5 micrometers). When the stylus electrode 60 becomes wider, the cross-talk in the signal pickup output increases and it becomes desirable to replace the pickup stylus.

FIG. 5 shows a sandwich form of a pickup stylus structure 70. As shown therein, the sandwich stylus includes first and second dielectric support members 72 and 74 in which a narrow conductive electrode 76 is embedded.

As previously indicated, although the sandwich stylus is advantageous in that the stylus electrode does not get wider as the stylus wears away, it is difficult to achieve an accurate registration between the stylus electrode and the stylus tip due to the smallness of the dimensions involved.

Figure 8:
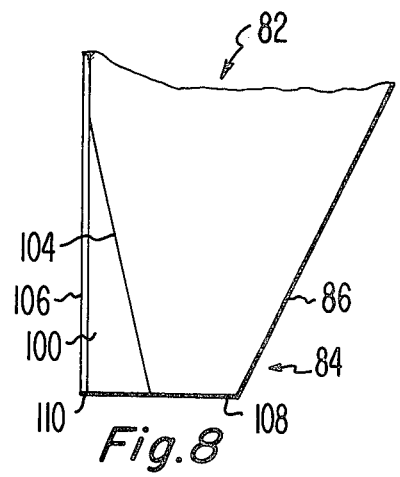
Figure 9:
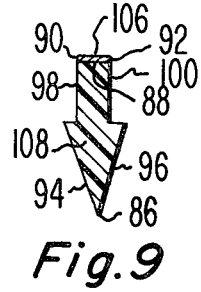
FIGS. 9-14 are cross-sections of the narrowed-electrode pickup stylus of FIGS. 6-8 taken along lines 9—9 to 14—14, respectively, in FIG. 7.

A narrowed-electrode pickup stylus 80 having an arrowhead-shape cross-section in the region of its tip, pursuant to this invention, overcomes these problems. FIG. 6 is the perspective view of the narrowed-electrode stylus 80. FIGS. 7 and 8 illustrate, respectively, the front view and the side view of the narrowed-electrode stylus 80. FIGS. 9–14 show successive cross-sections of the narrowed-electrode stylus 80.

As shown in the respective drawings, the narrowed-electrode stylus 80 includes a dielectric support element 82 which tapers toward a tip 84. The dielectric support element 82 has an arrowhead cross-section in the region of its tip 84.

The arrowhead-shape cross-section is defined by a prow 86, a substantially flat rear surface 88 remote from the prow having substantially parallel edges 90 and 92, a pair of side surfaces 94 and 96 converging toward the prow, a pair of additional side surfaces 98 and 100 extending substantially orthogonally from from the substantially parallel edges of the rear surfaces and proceeding toward the prow, and shoulder surfaces 102 and 104 joining the orthogonal surfaces with the converging surfaces.

The entire rear surface of the dielectric support element 82 is coated with conductive material to form a narrowed-electrode 106.

The dielectric support element 82 further has a bottom surface 108 extending from the bottom edge 110 of the substantially flat rear surface 88. The intersection of the rear, the orthogonal, the shoulder and the converging surfaces with the bottom surface 108 defines a stylus footprint. In this particular embodiment, the stylus footprint has an arrowhead shape.

It can be seen from FIGS. 9-13 that the stylus electrode 106 does not get wider as the stylus wears away. Therefore, the signal-to-noise ratio obtained by using the arrowheaded stylus is fairly constant throughout its useful life.

Additionally, it can be seen that the stylus life is appreciably extended since a greater volume of the stylus structure has to wear away before the stylus becomes unusable. An additional reason for the increase in stylus life is the fact that the stylus electrode is located in a relatively protected area during playback.

Illustratively, the configuration of the narrowed-electrode stylus 80 is as follows: the angle between the bevelled surfaces 94 and 96—42°, the length of the bottom edge 110 of the arrowhead shape footprint —3 micrometers, the longitudinal dimension of the arrowhead shape footprint—8 micrometers, the length of each of the shoulders of the arrowhead shape footprint—1 micrometer, the longitudinal dimension of the base of the arrowhead shape footprint—2 micrometers, the height of the narrowed-electrode in the region of the stylus tip—5 micrometers, the electrode depth—0.2 micrometers, and the angle between the prow and the bottom surface 108 of the stylus—145°.

With this configuration, the life of the narrowed-electrode stylus is about twice the life of the previously mentioned V-tipped stylus and the increment in the signal-to-noise ratio is of the order of 3dB (average).

The narrowed-electrode stylus not only offers advantages in performance and stylus life, but it also is relatively easy to fabricate by modifying a V-tipped stylus to obtain a narrowed-electrode stylus.

Figure 15:
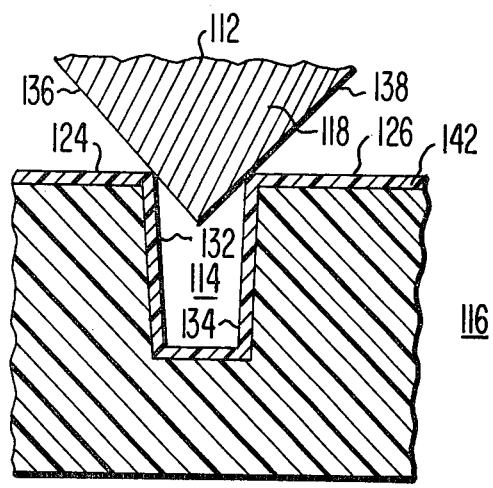
FIGS. 15 and 16 illustrate a portion of a lapping disc suitable for forming the narrowed-electrode pickup stylus of FIGS. 6-8.
Figure 16:
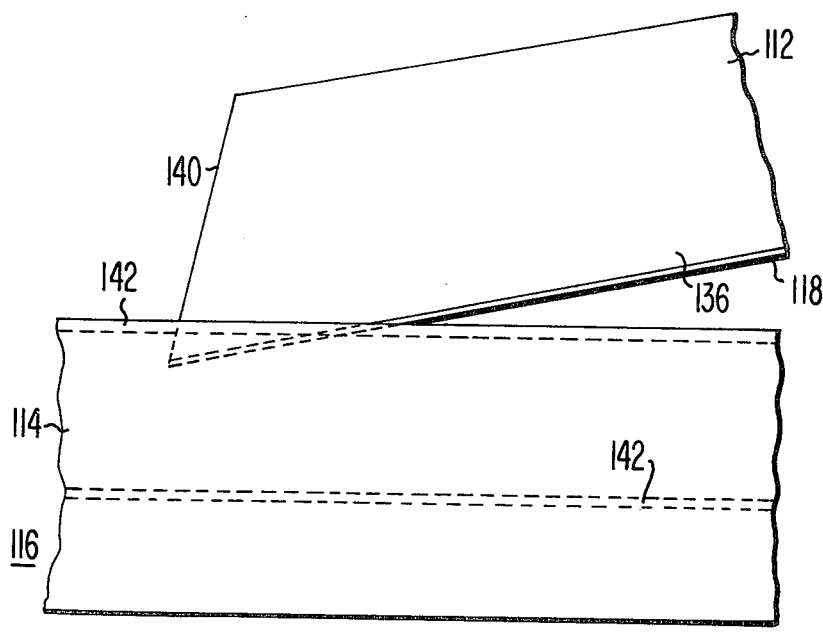

The narrowed-electrode stylus 80 is formed by introducing a V-tipped stylus 112 into an abrasive groove 114 of a lapping disc 116 with its electrode 118 disposed substantially orthogonally to the lapping disc, as shown in FIG. 15, while an appropriate stylus/disc relative motion is established. After allowing the stylus 112 to register itself with respect to the groove 114, the electrode face of the stylus is gently tilted toward the lapping disc 116 until the electrode 118 makes a substantially shallow angle relative to the lapping disc (e.g., 5°) as shown in FIG. 16. The stylus 112 is run in the tilted position for a time interval appropriate for the dimensions desired (e.g., 5–20 second where the dielectric support element is sapphire and the lapping disc has $SiO_2$ coating).

Figure 17:
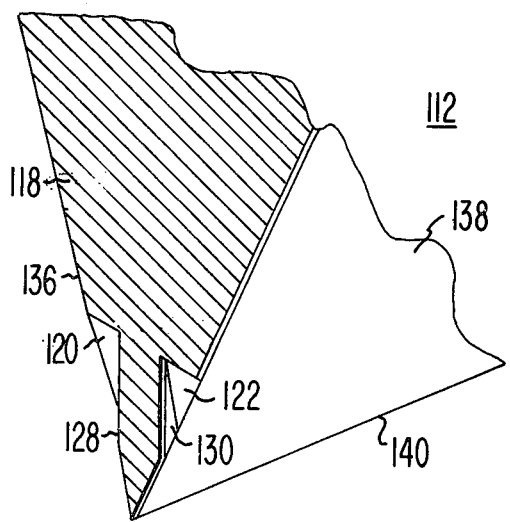
FIG. 17 shows the narrowed-electrode pickup stylus of FIGS. 6-8 before stylus shoe lapping.

FIG. 17 shows the way the stylus 112 looks after it is run in the lapping disc 116 in the tilted position for the specified time interval. As shown therein, the shoulder surfaces 120 and 122 are lapped by the lands 124 and 126 of the lapping disc 116 and the substantially orthogonal surfaces 128 and 130 are lapped by the walls 132 and 134 of the abrasive groove 114. The bevelled surfaces 136 and 138 of the stylus 112 intersect with each other to define a prow 140.

The bottom of the stylus 112 shown in FIG. 17 is shoe-lapped to form a substantially flat bottom surface. After shoe-lapping, the stylus will be of the form shown in FIGS. 6–8.

The narrowed-electrode stylus fabricated in this fashion provides a very precise registration between the narrowed-electrode and the stylus tip.

While in this particular embodiment, the abrasive groove 114 has a trapezoidal cross-section, as shown in FIG. 15, to obtain substantially orthogonal surfaces 128 and 130, the abrasive groove may be made to have a V-shaped cross-section to obtain flared surfaces interconnecting the shoulder surfaces 120 and 122 with the rear surface of the stylus support element.

The width of the abrasive groove 114 is determined by the desired width for the narrowed-electrode (e.g., 3 micrometers).

The lapping disc 116 shown in FIG. 15 has lands 124 and 126 which extend substantially orthogonally from the walls 122 and 124 of the abrasive groove 114 to obtain shoulder surfaces 120 and 122 as shown in FIG. 17. However, the lands 124 and 126 may be flared so as to obtain flared shoulder surfaces interconnecting the orthogonal surfaces with the converging surfaces of the stylus.

The V-tipped stylus 112 may be held in orthogonal position shown in FIG. 15 for a given time interval to obtain a keel tip of the type shown in the U.S. Pat. application Ser. No. 781,302, of Mr. E. O. Keizer, filed on Mar. 25, 1977, and entitled "METHOD FOR FORMING KEEL-TIPPED STYLUS FOR VIDEO DISC SYSTEMS." Subsequent to the formation of the keel tip, the electrode face of the stylus 112 can be gently tilted toward the lapping disc until it subtends an acute angle relative to the lapping disc 116. The stylus 112 may be held in the tilted position shown in FIG. 16 for a specified time interval to form a section having an arrowhead-shape cross-section above the keel tip. The stylus made in this fashion will have a pentagonal footprint until the keel tip is worn away, and then it will have an arrowhead shape footprint.

Figure 12:
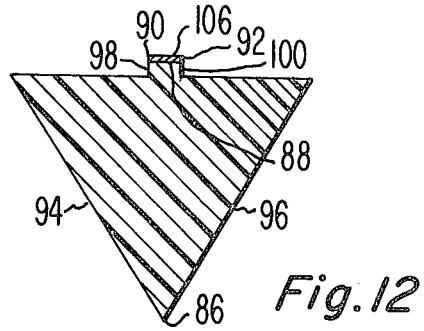
Figure 10:
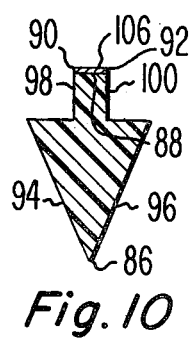
Figure 13:
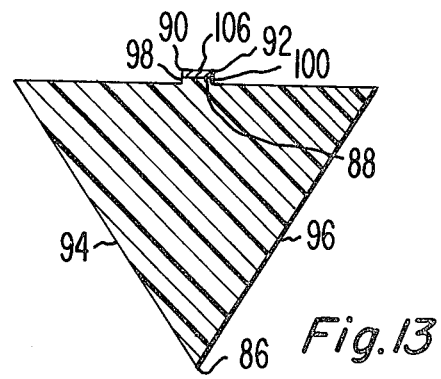
Figure 11:
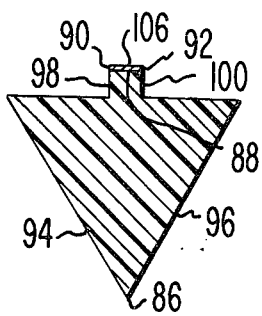
Figure 14:
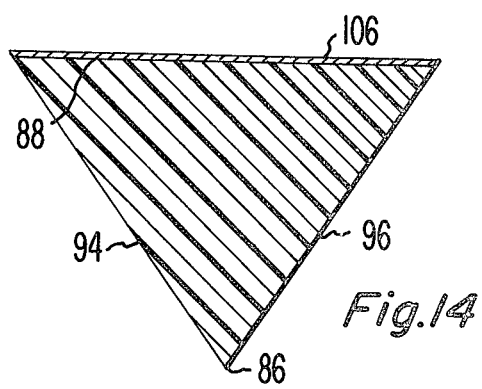

The manufacture of the lapping disc 116 will now be described. A fairly flat and smooth copper clad substrate is coated with a thick coating (e.g., several micrometers) of photoresist. The photoresist coated substrate is exposed with an intense beam of energy (e.g., electron beam or light) of the desired width (e.g., 3.0 micrometers) along a spiral track of a coarse pitch. After developing the exposed photoresist coated substrate, the exposed photoresist region is removed to form a coarse spiral groove on the substrate. A metal stamper is obtained therefrom by a process such as electroless plating. The metal stamper is used to press plastic discs. The plastic discs may be made from the same material as video discs. An abrasive material, such as $SiO_2$, is deposited thereon to form an abrasive layer 142 as shown in FIGS. 12 and 13.

Narrowed-electrode styli, in accordance with the embodiments of the present invention, have been successfully made from diamond, as well as from sapphire, support element.

What is claimed is:

1. In a playback system including a turntable for rotating a disk record having signals prerecorded along a spiral track of a given width and disposed on the surface of said record; a pickup stylus for playing back said prerecorded signals when stylus/record relative motion is established; said pickup stylus comprising:

a dielectric support element which tapers toward a tip;

said dielectric support element having an arrowhead-shape record-engaging portion in the region of said tip;

said arrowhead-shape record-engaging portion being defined by a rear edge, a pair of side edges extending substantially orthogonally from the ends of said rear edge, a pair of outwardly extending edges originating from the ends of said side edges remote from said rear edge, and a pair of edges extending from the ends of said outwardly extending edges remote from said side edges and converging at a prow;

said dielectric support element further including in said tip region thereof a substantially flat rear surface angularly disposed relative to said record-engaging portion remote from said prow and having a pair of substantially parallel edges terminating at said ends of said rear edge;

the maximum separation between said substantially parallel edges of said angularly disposed rear surface, in the region of said tip, being less than said given track width; and a layer of conductive material adherent to said angularly disposed rear surface between said substantially parallel edges thereof to form an electrode;

wherein said stylus is arranged in said track for playback such that, at the point of reception of said stylus, said rear edge is disposed transverse to said track and in contact therewith, said substantially orthogonally extending side edges of said record-engaging portion are disposed in the direction of said track and the movement of said record beneath said stylus reception point extends from said prow toward said rear edge.

2. A pickup stylus as defined in claim 1 wherein said dielectric support element exhibits said shape at its extremity so that said pickup stylus has an arrowhead-shape footprint.

3. A pickup stylus as defined in claim 1 wherein, in the region of said stylus tip, the ratio defined by the electrode width in the numerator and the maximum corresponding dimension of said support element in the denominator decreases in a direction opposite to the direction of said taper.

4. In a playback system including a turntable for rotating a disc record having signals prerecorded along a spiral track of a given width and disposed on the surface of said record; a pickup stylus for playing back said prerecorded signals when stylus/record relative motion is established; said pickup stylus comprising:

a dielectric support element having a body which tapers toward a tip;

said tapering body having an arrowhead-shape record-engaging portion in the region of said tip;

said arrowhead-shape record-engaging portion being defined by a prow terminating at the apex of said arrowhead-shape record-engaging portion, a substantially flat rear surface angularly disposed relative to said record-engaging portion remote from said prow and having a pair of substantially parallel edges terminating at the ends of the base edge of said arrowhead-shape record-engaging portion, a pair of side surfaces extending substantially orthogonally from said substantially parallel edges of said angularly disposed rear surface and terminating at the side edges of said arrowhead-shape record-engaging portion, a pair of outwardly extending surfaces originating from the edges of said side surfaces remote from said rear surface and terminating at the outwardly extending edges of said arrowhead-shape record-engaging portion, and a pair of surfaces extending from the edges of said outwardly extending surfaces remote from said side surfaces and converging at said prow, said converging surfaces terminating at the converging edges of said arrowhead-shape record-engaging portion;

the maximum distance between said substantially parallel edges of said angularly disposed rear surface, in the region of said tip, being less than said given track width; and a layer of conductive material adherent to said angularly disposed rear surface between said substantially parallel edges thereof to form an electrode;

wherein said stylus is arranged in said track for playback such that, at the point of reception of said stylus, said base edge is disposed transverse to said track and in contact therewith, said substantially orthogonally extending side edges of said record-engaging portion are disposed in the direction of said track, and the movement of said record beneath said stylus reception point extends from said prow toward said base edge.

5. A pickup stylus as defined in claim 4 wherein said dielectric support element exhibits said shape at its extremity so that said pickup stylus has an arrowhead-shape footprint.

6. A pickup stylus as defined in claim 4 wherein, in the region of said stylus tip, the ratio defined by the electrode width in the numerator and the maximum corresponding dimension of said support element in the denominator decreases in a direction opposite to the direction of said taper.

* * * * *